July 29, 1969     H. DAHMS     3,458,421
ELECTRODE WITH INTEGRAL FLOW CHANNEL
Filed July 15, 1966     2 Sheets-Sheet 1

INVENTOR
HARALD DAHMS
BY Thomas J. Kilgannon Jr.
ATTORNEY

United States Patent Office 3,458,421
Patented July 29, 1969

---

3,458,421
ELECTRODE WITH INTEGRAL FLOW CHANNEL
Harald Dahms, Ossining, N.Y., assignor to International Business Machines Corporation, Armonk, N.Y., a corporation of New York
Filed July 15, 1966, Ser. No. 565,658
Int. Cl. B01k *3/04*
U.S. Cl. 204—195    7 Claims

ABSTRACT OF THE DISCLOSURE

An ion sensitive electrode structure adapted for in situ rejuvenation of an ion sensitive meansuring electrode consisting of a flow channel for carrying a fluid containing different ions therealong is disclosed. An ion sensitive electrode integral with the flow channel and another electrode disposed in insulated spaced relationship with the first electrode to permit the flow of current between the electrodes integral with the flow channel is also disclosed. Means for reversibly applying a voltage to the electrodes to rejuvenate the meansuring electrode is also shown.

---

This invention relates generally to electrodes for the detection of ions in the electrochemical analysis of fluids and more particularly relates to an electrode for detecting the presence of halide and hydrogen ions in fluids.

Electrodes responsive to given ions are well known in the prior art. The silver-silver halide electrodes responsive to the chloride, bromide and iodide ion are also well known. In the usual case, a silver electrode must be coated with a silver halide which is a surface sensitive to a related halide ion. The electrode to be coated is placed in a saturated electrolytic solution containing a halide ion along with a silver counterelectrode and a battery is connected between the electrodes. The voltage applied to the electrodes is caused to undergo several reversals of polarity to alternately clean and recoat the silver halide which must be present to detect the presence of hailde ions in a test solution. In the prior art, the usual silver-silver halide electrode is rejuvenated on a daily basis, However, it has been found where high accuracy is desired that more frequent rejuvenation should be made to prevent "aging" of the ion sensitive electrode. "Aging" or degradation of the silver halide coating resulting in a degradation of the accuracy of measurements.

Silver-silver halide electrodes are usually found having configurations which are susceptible of being dipped into the solution to be measured or are maintained in fixed position within a test tube so that the fluid to be measured can be introduced around the measuring electrode. From the foregoing, it should be clear that electrodes of this type are not amenable for use in making high speed measurements because of the manipulations involved in measuring and rejuvenation. Also, the known electrodes require relatively large samples of fluid to measure the chloride ions contained therein. Systems which seek to automate the measurement of halide and other ions would suffer from both a speed and accuracy point of view because they are not easily incorporated into such systems, if they are capable of being used at all. One requirement of electrodes which are useful in the measurement of ions for automated systems is that they should not be removed from the system for cleaning or rejuvenation between measurements. Further, such electrodes should be capable of measuring the ion concentration of extremely small samples without compromising accuracy and should be compatible in size and cost with known electrodes which measure other ions.

It is, therefore, an object of this invention to provide silver-silver halide, silver-antimony oxide and silver-bismuth oxide electrodes for the measurement of ions which are superior to prior art electrodes.

Another object is to provide silver-silver halide, silver-antimony oxide and silver-bismuth oxide electrodes which permit the in situ generation of an ion-sensitive coating, measurement, cleaning and rejuvenation of the electrode.

Another object is to provide a halide and hydrogen ion measuring electrode which is capable of measuring the ion concentrations of very small samples.

Another object is to provide a halide and hydrogen ion measuring electrode which is accurate and compatible with mass screening or automatic techniques.

Still another object is to provide a hydrogen and halide ion measuring electrode in which the measuring and rejuvenation electrodes form a portion of the channel through which the test sample flows.

Yet another object is to provide a halide and hydrogen ion measuring electrode which is simple in construction, rugged and easy to assemble.

In accordance with the teching of this invention, a silver-silver halide electrode or a silver-bismuth oxide, or a silver-antimony oxide electrode is provided in which a capillary tube which carries the test sample is partially formed by the electrodes and partially formed by insulating members which space the electrodes. The electrodes are provided with contacts which may in turn be connected to a measuring instrument or to a source of voltage for rejuvenation of the ion-sensitive electrode. The electrode arrangement permits the in situ measurement of halide or hydrogen ion concentrations and the in situ application of a voltage to the electrodes to accomplish initial generation and subsequent rejuvenation of a silver halide or bismuth or antimony oxide coating on the measuring electrode surface. Cleaning can also be accomplished with ease and because of the size of the capillary formed only small amounts of the sample being tested are required.

The foregoing and other objects, features and advantages of the invention will be apparent from the following more particular description of a preferred embodiment of the invention, as illustrated in the accompanying drawings.

Figure 1:
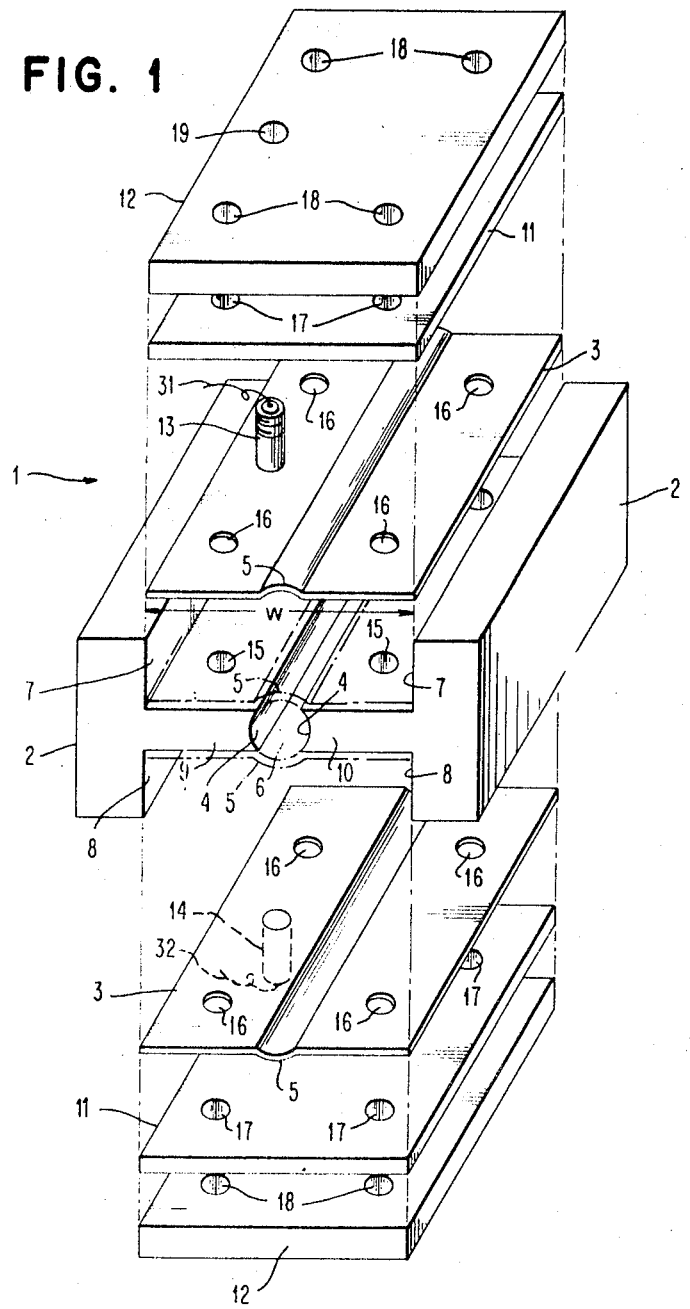
FIG. 1 is an exploded perspective view of an electrode for use in electrochemical analysis which in accordance with the present invention is amenable to in situ rejuvenation of its ion sensitive electrode.

Referring to FIG. 1, there is shown an exploded perspective view of an electrode 1 which is useful in detecting the presence of hydrogen and halide ions selected from the group consisting of chloride, bromide and iodide ions. Electrode 1 will be characterized hereinafter as a chloride electrode for purposes of description. It should be appreciated, however, that electrode 1 works equally well as a detector of hydrogen, bromide or iodide ions and that the characterization of it as a chloride detecting electrode is made only by way of example and not by way of limitation.

Chloride electrode 1 basically consists of pairs of oppositely disposed insulating memebrs 2 and conductive members 3. Insulating members 2 contain concave arcuate portions 4 and conductive members 3 contain concave arcuate portions 5. Arcuate portions 4 and 5 are arcs of a circle which when assembled form a circular cylinder or flow channel 6 which extend along the longitudinal axis of electrode 1. Conductive arcuate portions 5 are shown in phantom in FIG. 1 in their ultimate juxtaposition with portions 4 to demonstrate clearly the structure of flow channel 6.

Shoulders 7, 8 extend upwardly and downwardly, respectively, from horizontally extending members 9, 10 which contain arcuate portions 4 at their extremities. Shoulders 7, 8 and the edges of members 9, 10 form cavities into which conductive members 3 are receivable. The width $w$ of members 3 is adjusted so that when the lengthwise edges of members 3 are in contacting relationship with shoulders 7, 8, arcuate portions 4, 5 form a perfect circle in cross-section. Insulating members 2 are preferably made of a plastic such as Delrin and conductive members 3 are preferably made of silver for reasons which will be apparent from what follows.

Also receivable in the cavities formed by shoulders 7, 8 and the edges of members 9, 10 are resilient insulating elements 11 which fit over conductive members 3 to place members 3 under a uniform pressure over their surface to inhibit deformation of arcuate portions 5. Cover plates 12 are also receivable in the above-mentioned cavities. Cover plates 12 retain members 3 and elements 11 in position and transmit a desired pressure to elements 11 in order to insure leak-tight operation. Elements 11 are preferably made of rubber and cover plates 12 are preferably made of insulating material such as Delrin.

Referring again to conductive members 3, contacts 13, 14 are shown attached to upper and lower members 3, respectively. Contacts 13, 14 are used to apply voltages to conductive members 3 so that when flow channel 6 is filled with a fluid containing chloride ions, a coating of silver chloride which is sensitive to the presence of chloride ions may be removed and replaced in situ. Also, one of the contacts, 13 for example, is used to connect with a measuring device (not shown) to deliver the voltage developed when the chloride ion sensitive surface comes in contact with a chloride ion containing solution.

In FIG. 1, members 9, 10 contain apertures 15, members 3 contain apertures 16, elements 11 contain apertures 17 and cover plates 12 contain apertures 18. Each of apertures 15–18 is in registry with a similarly positioned aperture located respectively on members 9, 10, 3, elements 11 and cover plates 12 and are adapted to receive bolts of insulation material which interconnect the various elements and members to form assembled electrode 1. Contacts 13, 14 extend thru elements 11 and cover plates 12 via apertures 19 in cover plates 12.

Figure 2:
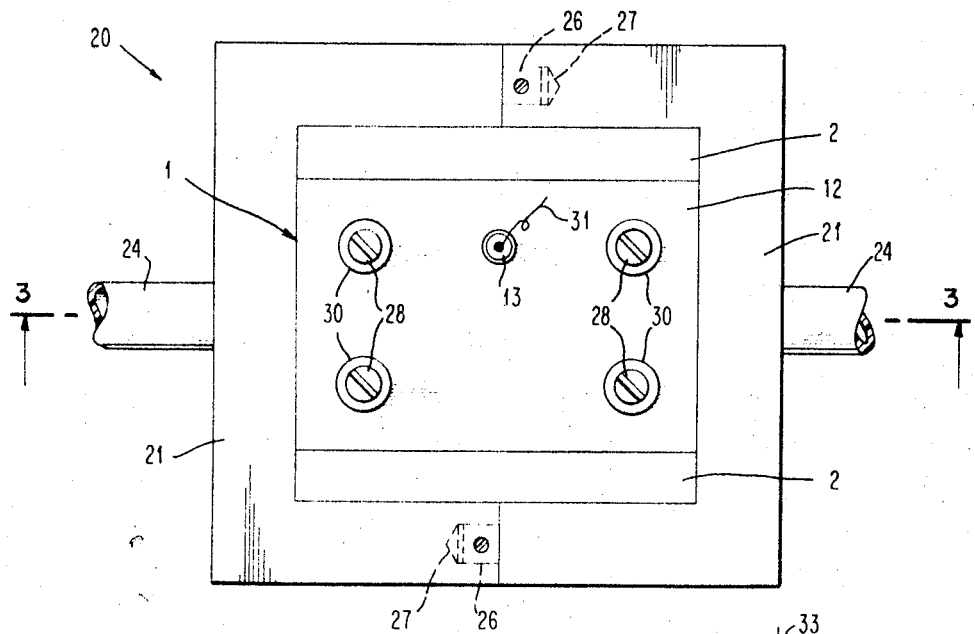
FIG. 2 is a top view of the assembled electrode of FIG. 1 mounted in a housing having input and output fluid connections therein.
Figure 3:
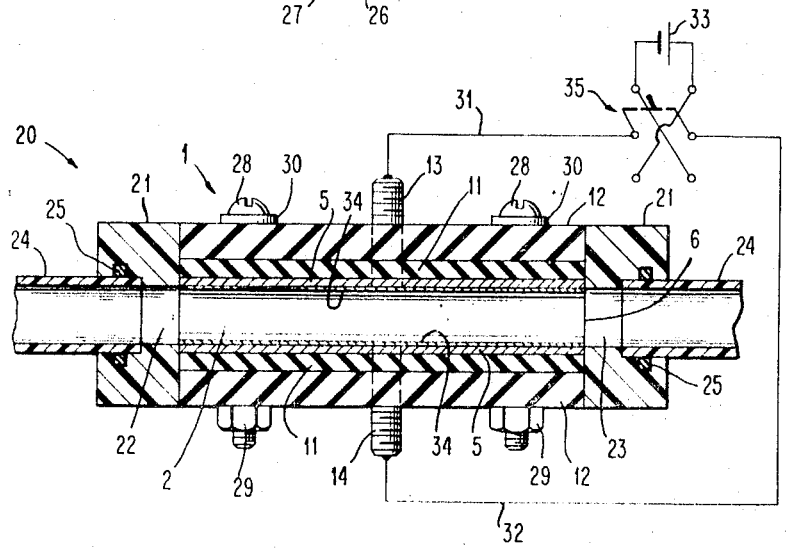
FIG. 3 is a cross-sectional view of FIG. 2 taken along line 3—3 of FIG. 2 showing in detail the internal arrangement of the electrode in assembled form and a voltage source for rejuvenation of the measuring electrode.

Referring now to FIGS. 2 and 3, there is shown a top view and cross-sectional view, respectively, of electrode 1 incorporated in a housing and showing input and output flow channels. In FIGS. 2 and 3, housing 20 consists of two identical U-shaped frames 21 which fit around the periphery of electrode 1 in close fiting relationship. Frames 21 contain ports 22, 23 in which tubings 24 are receivable. Tubings 24 have the same inner diameter as flow channel 6 and are retained in ports 22 and 23 by O-rings 25. Frames 1 are designed so that flow channel 6, ports 22 and 23 and tubing 24 are in coaxial alignment. Frames 21 can be snapped together and maintained in rigid alignment by virtue of male and female members 26 and 27, respectively, disposed at the extremities of frames 21. Electrode 1 is maintained in assembled form by virtue of insulating nuts, bolts and washers 28, 29, 30, respectively.

In operation, a test sample or other conductive solution containing chloride ions is introduced into flow channel 6 via tubing 24 and port 22. When the fluid fills flow channel 6, a voltage is applied across contacts 13, 14 by way of conductors 31, 32 from battery 33. Assume, for purposes of example, that contact 13, which is connected to upper conductive member 3 is the measuring electrode sensitive to chloride ions. A coating of silver chloride is the ion sensitive substance which makes upper conductive member 3 responsive to the chloride ion. Upper member 3 is assumed to be in the coated state. By applying a negative polarity voltage to contact 13 and a positive polarity voltage to contact 14, a coating of silver chloride 34 is reduced to metallic silver and deposited on lower concave arcuate portion 5. By simply reversing the voltage applied to contacts 13, 14 by means of a reversing switch 35, the ion sensitive silver chloride coating 34 is removed from lower arcuate portion 5 and replaced on upper arcuate portion 5. The ion sensitive coating using the above described voltage application and reversal is therefore rejuvenated in situ, i.e. the ion sensitive coating is rejuvenated without the necessity for removing electrode 1 from a source or sources of fluid to which the electrode is connected for measuring purposes. Because of this in situ rejuvenating and measuring capability, the silver-silver chloride electrode no longer requires special handling as it did with prior art electrodes and a truly automated system is feasible using the silver-silver chloride electrode of the present invention in conjunction with electrodes responsive to different ions. It should be noted that during the rejuvenating step arcuate portion 5 of lower conductive member 3 acts as a counterelectrode and when arcuate portion 5 of upper conductive member 3 is measuring chloride ion concentration, arcuate portion 5 of lower conductive member 3 is inactive.

The capability involved in the structure of the present invention will be better understood when consideration is given to the size of the elements involved. Flow channel 6 has a diameter of approximately one millimeter. Because of this, only extremely small volumes of test samples are required to obtain measurements. Also, the overall structure is rugged and easy to assemble.

The arrangement shown in FIG. 1–3 is a preferred embodiment of the present invention which is particularly adapted to make measurements on fluid samples such as blood, but it should be appreciated that the dimensions may be scaled-up to accommodate larger samples. Also, arcuate portions 5 can be a deposited coating on the inner surface of a hollow member where the hollow member is of sufficient size to permit coating. Also, silver wires may be inserted into a tube to act as a measuring electrode and a counter electrode where the inner diameter of the tube is sufficiently large.

The silver-silver chloride electrode of the present invention is particularly suited for use in completely automatic electrochemical analysis units similar to the system described in applicant's co-pending application Ser. No. 565,504 entitled "Method and Apparatus for Automatic Electrochemical Analysis" filed of even date and assigned to the same assignee as the present invention.

As indicated briefly hereinabove, electrode 1 can be adapted to measure pH in addition to the halide ions. The structure of the invention remains physically unaltered and only the materials change depending on the ion sought to be detected. Thus, where pH measurements are being made upper conductive member 3 may be made of antimony or bismuth oxide, materials which are sensitive to the presence of hydrogen ions. By applying and reversing a voltage as described hereinabove in connection with the silver-silver chloride electrode, the oxide coatings are removed and replaced in exactly the same way. A silver counterelectrode may be used with the bismuth and antimony oxide measuring electrode during rejuvenation.

While the invention has been particularly shown and described with reference to a preferred embodiment thereof, it will be understood by those skilled in the art that various changes in form and details may be made therein without departing from the spirit and scope of the invention.

What is claimed is:

1. An electrode adapted for in situ rejuvenation of ion sensitive coating having a given longitudinal axis comprising:

first and second insulating members extending lengthwise of and disposed in spaced relationship about said axis, said insulating members having arcuate portions disposed in face-to-face relationship first and second conducting members extending lengthwise of said axis and interposed between said first and second insulating members to maintain said arcuate portions of said insulating members in spaced relationship, said first and second conducting members having arcuate portions mating with said arcuate portions of said first and second insulating members along the length thereof to form a hollow member.

2. An electrode according to claim 1 further including an ion sensitive coating disposed on a surface of one of said first and second conducting members.

3. An electrode according to claim 2 wherein said ion sensitive coating includes a coating of materials selected from the group consisting of silver chloride, silver bromide and silver iodide, bismuth oxide and antimony oxide.

4. An electrode according to claim 3 wherein said second conducting member consists of silver.

5. An electrode according to claim 1 further including means connected to said first and second conducting members for applying a voltage therebetween to remove and replace said ion sensitive coating.

6. An electrode according to claim 5 wherein said means connected to said first and second conducting members for applying a voltage therebetween includes a contact connected to each of said first and second conducting members, a voltage source, and reversing means connected with said source and said contacts to alternately apply voltages of different polarity across said first and second conducting members.

7. An electrode according to claim 1 wherein said first conducting member consists of a conductive metal selected from the group consisting of silver, bismuth and antimony and an ion sensitive coating selected from the group consisting of silver chloride, silver bromide, silver iodide, antimony oxide and bismuth oxide.

References Cited

UNITED STATES PATENTS

| | | | |
|---|---|---|---|
| 2,864,750 | 12/1958 | Hughes et al. | 204—149 |
| 2,998,371 | 8/1961 | Sabins | 204—196 |
| 3,047,488 | 7/1962 | Laird et al. | 204—195 |
| 3,051,631 | 8/1962 | Harbin et al. | 204—1.1 |
| 3,104,221 | 9/1963 | Hill | 204—272 |
| 3,135,674 | 6/1964 | Ruetschi | 204—151 |
| 3,151,052 | 9/1964 | Arthur et al. | 204—195 |
| 3,290,584 | 12/1966 | Van Deursen Harms et al. | 204—195 |

OTHER REFERENCES

Ives et al. "Reference Electrodes," 1961, Academic Press, N.Y., pp. 188–191, 339, 352 and 353.

JOHN H. MACK, Primary Examiner

T. TUNG, Assistant Examiner

U.S. Cl. X.R.

204—275, 280, 286, 297